United States Patent
Johnston et al.

(10) Patent No.: US 7,233,457 B2
(45) Date of Patent: Jun. 19, 2007

(54) HEAD FOR PERPENDICULAR RECORDING WITH REDUCED ERASURE

(75) Inventors: Alan B. Johnston, Londonderry (IE); Mark A. Gubbins, Letterkenny (IE); William J. O'Kane, Limavady (IE)

(73) Assignee: Seagate Technology LLC, Bloomington, MN (US)

( * ) Notice: Subject to any disclaimer, the term of this patent is extended or adjusted under 35 U.S.C. 154(b) by 546 days.

(21) Appl. No.: 10/737,491

(22) Filed: Dec. 16, 2003

(65) Prior Publication Data
US 2005/0128637 A1 Jun. 16, 2005

(51) Int. Cl.
*G11B 5/127* (2006.01)

(52) U.S. Cl. .................................... 360/125
(58) Field of Classification Search .............. 360/125, 360/126, 123, 121, 128
See application file for complete search history.

(56) References Cited

U.S. PATENT DOCUMENTS

| | | | |
|---|---|---|---|
| 4,413,297 A | 11/1983 | Tanaka et al. | |
| 4,731,157 A | 3/1988 | Lazzari | |
| 5,196,976 A | 3/1993 | Lazzari | |
| 6,513,228 B1 | 2/2003 | Khizroev et al. | |
| 6,728,065 B2* | 4/2004 | Batra et al. | 360/126 |
| 6,807,027 B2* | 10/2004 | McGeehin et al. | 360/125 |
| 6,842,313 B1* | 1/2005 | Mallary | 360/319 |
| 6,954,340 B2* | 10/2005 | Shukh et al. | 360/317 |
| 7,008,548 B2* | 3/2006 | Chae et al. | 216/13 |
| 7,009,812 B2* | 3/2006 | Hsu et al. | 360/126 |
| 7,042,682 B2* | 5/2006 | Hu et al. | 360/317 |
| 7,054,106 B2* | 5/2006 | Kudo et al. | 360/126 |
| 7,102,854 B2* | 9/2006 | Wang et al. | 360/126 |
| 2001/0017746 A1* | 8/2001 | Nishida et al. | 360/125 |
| 2002/0036871 A1 | 3/2002 | Yano et al. | |
| 2002/0071208 A1* | 6/2002 | Batra et al. | 360/125 |
| 2003/0002211 A1* | 1/2003 | Tsuchiya et al. | 360/125 |
| 2003/0039064 A1 | 2/2003 | Khizroev et al. | |
| 2004/0201918 A1* | 10/2004 | Guan et al. | 360/125 |
| 2004/0264034 A1* | 12/2004 | Watanabe et al. | 360/78.04 |
| 2005/0068670 A1* | 3/2005 | Amin et al. | 360/125 |
| 2005/0068678 A1* | 3/2005 | Hsu et al. | 360/126 |

OTHER PUBLICATIONS

M.L. Plumer, J. van Ek, D. Weller (Eds.); M. Mallary, The Physics of Ultra-High-Density Magnetic Recording, Springer Series in Surface Sciences, 2001, pp. 315-348.
Kiyoshi Yamakawa, Kaori Taguchi, Kazuyuki Ise, Naoki Honda, and Kazuhiro Ouchi; Single=pole recording head design for 100 Gbpsi perpendicular magnetic recording; Journal of Magnetism and Magnetic Materials 235 (2001); pp. 354-361.
M. Mallary, A. Torabi, and M. Benakli; One Terabit per Square Inch Perpendicular Recording Conceptual Design, IEEE Transactions on Magnetics, vol. 38, No. 4, pp. 1719-1724, 2002.

* cited by examiner

*Primary Examiner*—Allen Cao
(74) *Attorney, Agent, or Firm*—Kinney & Lange, P.A.

(57) ABSTRACT

A perpendicular writer of the present invention comprises a main pole connected to two return poles and further includes one or more shorting shields thereby reducing erasure field on double layer perpendicular media. The perpendicular writer may include side shorting shields connecting the first and second return poles thereby modifying the crosstrack field gradient. Additionally, the perpendicular writer may include a top shorting shield modifying the downtrack gradient and may additionally include a bottom shorting shield for further reduction of erasure fields. The distance between the main pole and the shorting shields may be modified to customize the write field gradient.

24 Claims, 7 Drawing Sheets

HEAD FOR PERPENDICULAR RECORDING WITH REDUCED ERASURE

BACKGROUND OF THE INVENTION

The present invention relates generally to the storage and retrieval of data within magnetic media. In particular, the present invention relates to the placement of shorting shields around the main pole of a perpendicular writer.

A typical transducing head consists of two portions: a writer portion for storing magnetically encoded information on magnetic media and a reader portion for retrieving the magnetically encoded information from the media. The magnetic media is typically organized into tracks which are further organized into bit fields. The MR sensor travels along a track in close proximity to the media to detect differences in the stored magnetic flux between bit fields. Changes in the magnetic flux from one bit field to another result in a corresponding resistivity change and consequent voltage output from the MR sensor. Since it is the changes from one bit field to another that are detected and result in data output; it is critical that those transitions be sharp, that is, as narrow as possible. Sharp transitions, as well as other characteristics for successful reading, are not controlled by the reader, but instead by the writer and the process used to encode the data within the magnetic media.

A perpendicular writer typically consists of a main pole with at least one adjacent return pole separated from each other at an air bearing surface. Additionally, the magnetic poles are connected by a back via at a region away from the air bearing surface. Positioned between the two poles are one or more layers of conductive coils encapsulated by electrically insulating layers. To write data to the magnetic media, a time varying electrical current, or write current is caused to flow through the conductive coils.

The write current produces a time varying magnetic field in the magnetic poles called the write field. The magnetic poles, back via and the magnetic media are part of a magnetic flux path, which is also referred to as a reluctance circuit. The write field passes from the main pole into the magnetic media, thereby writing to a recording layer within the media. Residual magnetic flux from the main pole closes the reluctance circuit via a soft underlayer of the magnetic media. As magnetic flux passes through recording layer, thereby closing the reluctance circuit through soft underlayer, recorded bits can be destabilized resulting in the information stored in the recording layer being erased.

Recent years have seen a considerable increase in data storage densities. Generally, the storage capacity of a magnetic data storage and retrieval device is increased through use of magnetic media having an increased areal density. Areal density is the number of units of data stored in a unit area of the media. Areal density is determined by two components of the magnetic media: the track density (the number of data tracks per unit width of the magnetic media) and the linear density (the number of units of data stored per unit of length of the data track). To increase the areal density of a magnetic media one must increase the linear density and/or the track density of the magnetic media.

Increases in areal density demand that writers must write to smaller bit fields with increasing flux density. One problem with conventional perpendicular writers is the effect of the write field on adjacent tracks and bit fields. The process of writing one bit field may cause erasure of the magnetic data stored both to the side in adjacent tracks or to the adjacent bit fields in front or behind the write head. That portion of the write field that causes unwanted erasure is referred to as erasure field. There remains a continuing need in the art for improved perpendicular writers with reduced erasure fields.

BRIEF SUMMARY OF THE INVENTION

A perpendicular writer having a main pole writes to high areal density double layer perpendicular media with reduced erasure fields. The perpendicular writer includes side shorting shields placed proximal to the main pole at the air bearing surface. The side shorting shields connect to first and second return poles at the air bearing surface. The side shorting shields, with or without optional top and bottom shorting shields, create a box around the main pole near the air bearing surface thereby modifying the write field gradient from the writer. The write field gradient is modified so as to reduce the erasure fields by allowing magnetic flux to complete the reluctance circuit within the writer by way of the shorting shields. The side shorting shields modify the crosstrack field gradient, while the top shorting shield modifies the downtrack gradient, thereby reducing erasure fields. The distance between the main pole and the shorting shields may be modified to customize the write field gradient.

DETAILED DESCRIPTION

Figure 1:
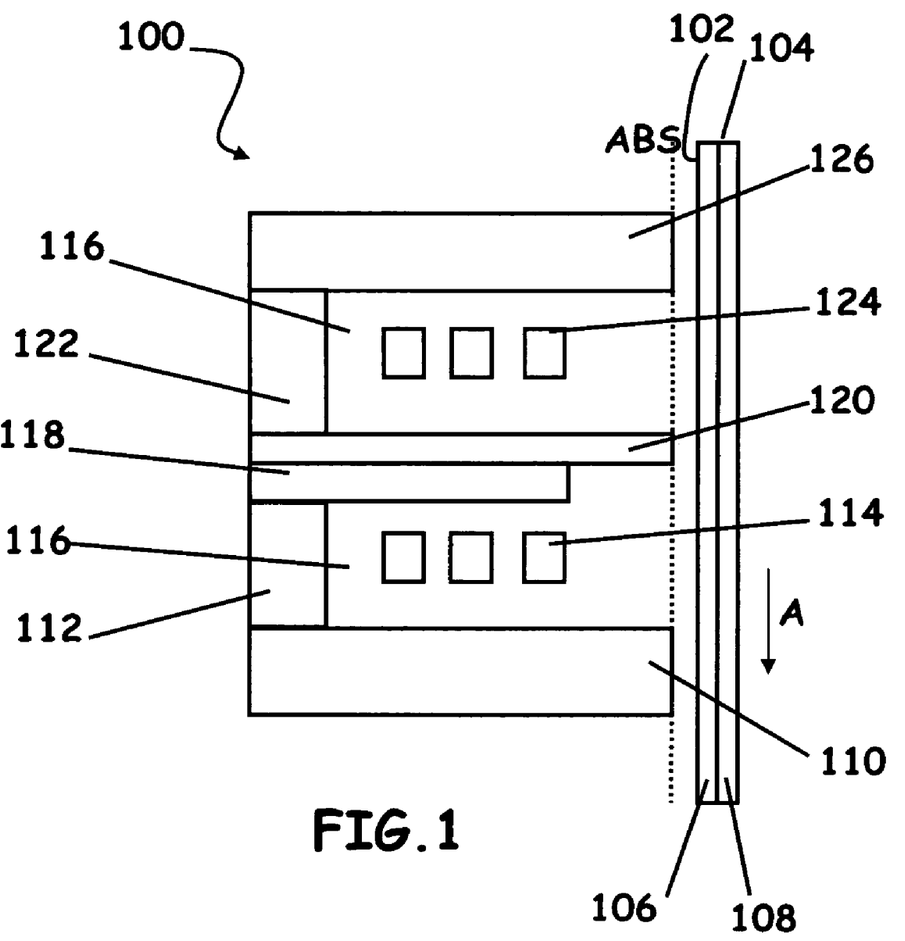
FIG. 1 is a cross-sectional view of a perpendicular writer of the present invention taken along a plane normal to the air bearing surface in the intrack direction.
Figure 2:
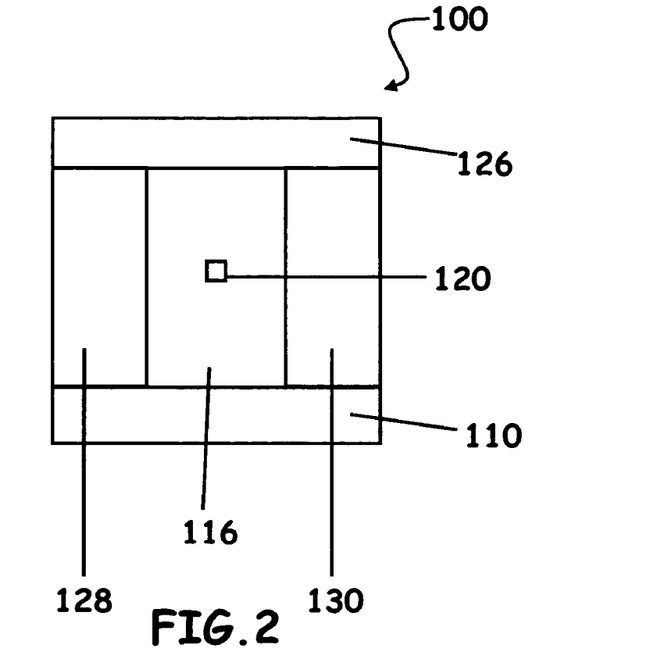
FIG. 2 is a bottom view of a perpendicular writer of the present invention viewed at the ABS.

FIG. 1 is a cross-sectional view of perpendicular writer 100. The cross-sectional view of FIG. 1 is taken along a plane normal to an air bearing surface (ABS) of perpendicular writer 100. FIG. 2 is a bottom view from the air bearing surface of perpendicular writer 100.

The ABS of perpendicular writer 100 faces surface 102 of magnetic media 104. Magnetic media 104 travels or rotates in a direction relative to perpendicular writer 100 as indicated by arrow A. Space between the ABS of perpendicular writer 100 and media surface 102 is preferably minimized while avoiding contact between perpendicular writer 100 and magnetic media 104.

Magnetic media 104 is typically a double layer perpendicular media comprised of a recording layer 106 and a soft underlayer 108. Recording layer 106 is typically formed of one or more hard magnetic materials and may include multilayer structures such as disclosed in U.S. Pat. No. 6,630,255, Multilayer Perpendicular Magnetic Recording Media With Exchange Decouple Spacer Layers, herein incorporated by reference. Soft underlayer 108 is typically formed from soft magnetic material. For example, suitable soft magnetic material includes CoFe and alloys thereof, FeAlN, NiFe, CoZrNb, and FeTaN, with CoFe and the FeAlN being most typical.

Perpendicular writer 100 includes first return pole 110, first back via 112, first set of coils 114, insulator 116, yoke 118, main pole 120, second back via 122, second set of coils 124, second return pole 126, first shorting shield 128 (FIG. 2) and second shorting shield 130 (FIG. 2). First return pole 110 is connected to first back via 112 at an end away from the air bearing surface of perpendicular writer 100. Second back via 122 contacts main pole 120 at an end away from the ABS. Second back via 122 also contacts second return pole 126 at an end away from the air bearing surface of perpendicular writer 100. First set of coils 114 is positioned between first return pole 110 and main pole 120 with adjacent yoke 118. Second set of coils 124 is positioned between main pole 120 and second return pole 126. Both first set of coils 114 and second set of coils 124 are positioned in insulator 116.

First return pole 110 and second return pole 126, as well as first back via 112 and second back via 122, are formed from soft magnetic materials such as but not limited to NiFe. The first set of coils 114 and second set of coils 124 are made from material with low electrical resistance, for example Cu. Insulator 116 is formed of a dielectric material thereby electrically isolating the coils. Main pole 120 is made from high moment soft magnetic material such as CoFe. Adjacent yoke 118 is made from soft magnetic material, such as NiFe, to improve the efficiency of flux delivery to main pole 120. First and second shorting shields 128 and 130 are made from blocks of soft magnetic material, such as NiFe, and are located at the air bearing surface of perpendicular writer 100. First shorting shield 128 and second shorting shield 130 are located on opposite sides of main pole 120 at or near the air bearing surface.

Perpendicular writer 100 employs either a one coil or two-coil design. Perpendicular writer 100 is presented in FIG. 1 with a two-coil design, but may be modified to include alternative coil designs including a one coil design with a single coil helically wrapped around main pole 120. The two-coil design includes a first set of coils 114 to carry current into the page and a second set of coils 124 to carry current out of the page, in effect letting current flow with opposite polarities. The effect is an efficient driving force to the main pole 120 and yoke 118, with reduction of the net driving force (MMF) on the first and second return poles 110 and 126 as compared to the one coil design.

FIG. 2 is a bottom view of the air bearing surface of perpendicular writer 100. FIG. 2 shows the position of first side shorting shield 128 and second side shorting shield 130 relative to main pole 120 and first and second return poles 110 and 126. First side shorting shield 128 and Second side shorting shield 130 are spaced from main pole 120 in positions on either side of main pole 120 in the cross-track direction. First side shorting shield 128 spans from first return pole 110 to second return pole 126. Likewise, second side shorting shield 130 spans from first return pole 116 to second return pole 126. The combination of first side shorting shield 128, first return pole 110, second side shorting shield 130 and second return pole 126 creates a box around main pole 120. First and second side shorting shields 128 and 130 of perpendicular writer 100 allows the reluctance circuit to advantageously close within perpendicular writer 100 rather than having magnetic flux pass through the recording layer 106 and soft underlayer 108 of magnetic media 104.

The inclusion of either or both first and second side shorting shields 128 and 130 modifies the crosstrack write field gradient of magnetic flux from perpendicular writer 100. Flux returns to the perpendicular writer 100 at the position of first and second side shorting shields 128 and 130. Consequently, the perpendicular component of the magnetic field is reduced over the area of the first and second side shorting shields 128 and 130 compared to conventional perpendicular writer designs with no side shields. The inclusion of side shorting shields reduces the magnetic flux density in those areas resulting in less destabilization of the recorded bits in the recording layer 106 of magnetic media 104.

Figure 3:
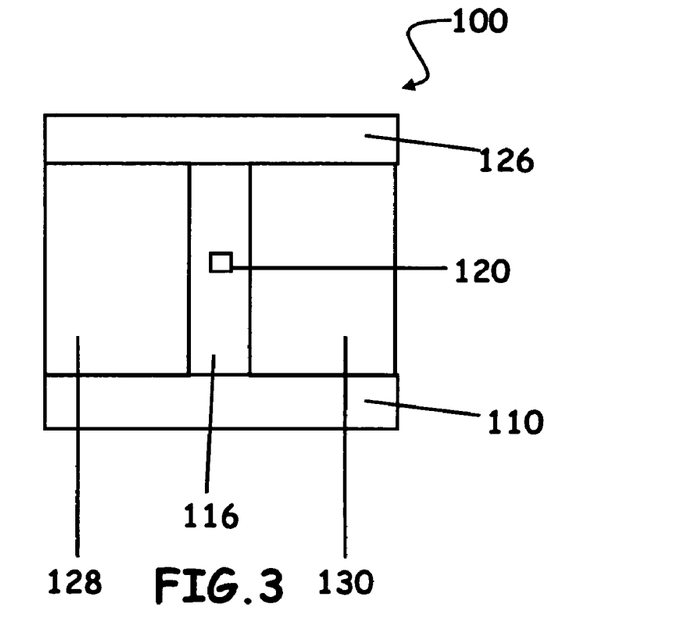
FIG. 3 is a bottom view of an alternative structure for a perpendicular writer of the present invention viewed at the ABS.

First and second side shorting shields 128 and 130 may be modified in width and location. For example, the distance between each side shorting shield and main pole 120 may be modified within a range from approximately 1 to 7 microns. The distance may be reduced such that first and second side shorting shields 128 and 130 are located closer to main pole 120 as shown in FIG. 3. Additionally, either or both of side shorting shields 128 and 130 may be recessed from the air bearing surface thereby increasing the reluctance through the magnetic media 104 and thereby reducing erasure fields.

Figure 4:
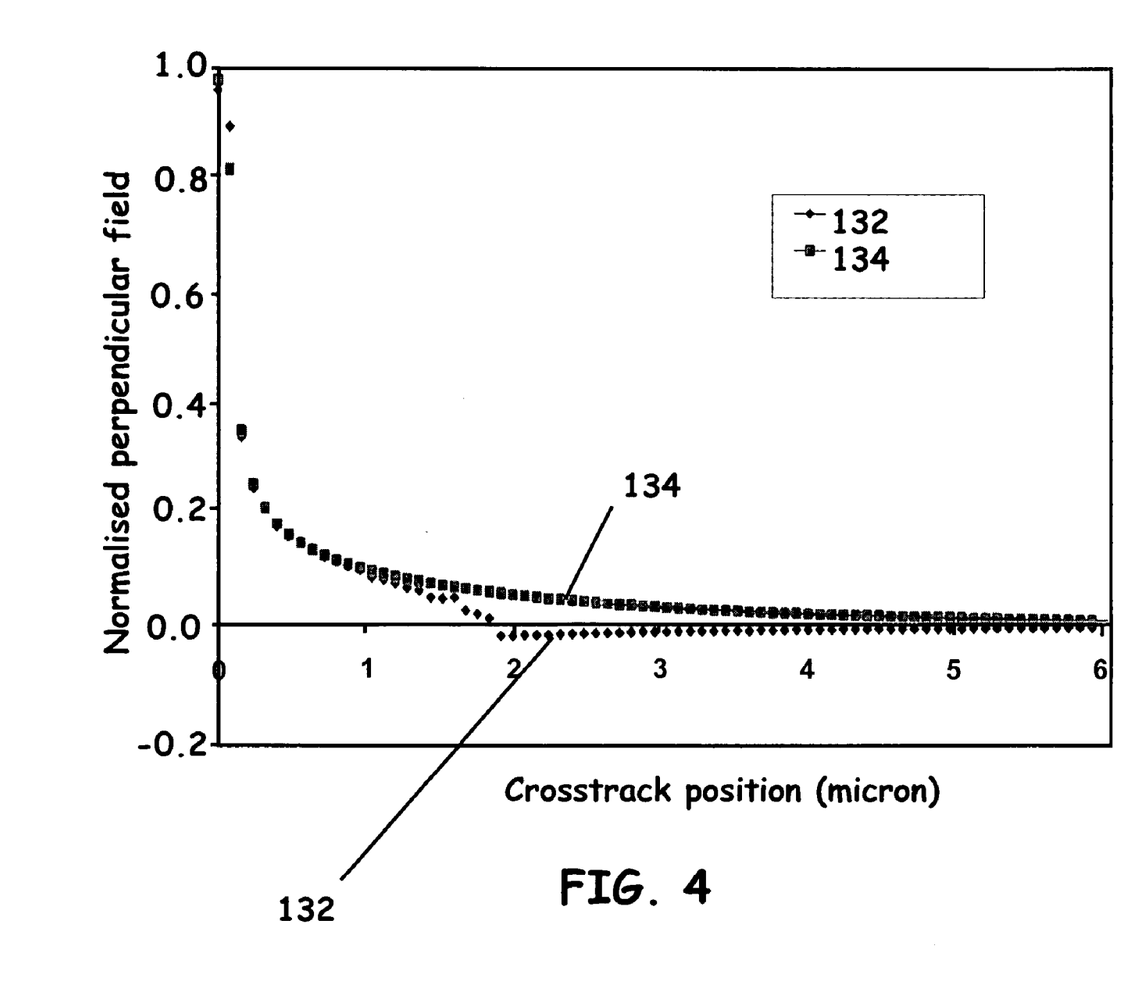
FIG. 4 is a graph of crosstrack field gradients for a conventional perpendicular writer and a perpendicular writer of the present invention.

FIG. 4 is a graph of crosstrack position versus normalized perpendicular field for purposes of illustrating the crosstrack field 132 of a perpendicular writer of the present invention with side shorting shields compared to the crosstrack field 134 of a similar perpendicular writer without side shorting shields. Crosstrack field 132 is for a perpendicular writer of the present invention with the structure shown in FIG. 3 wherein the side shorting shields 128 and 130 are positioned approximately 2 microns from main pole 120. The graph in FIG. 4 illustrates each write field 132 and 134 extending from the center (crosstrack position=0) of main pole across the perpendicular writer in the crosstrack direction. The crosstrack field 134 of the perpendicular writer without side shorting shields slowly attenuates over the distance shown. In contrast, the perpendicular writer with first and second side shorting shields 128 and 130 consistent with the present invention shows sharp attenuation in the write field 132 at the position of the side shorting shield.

Figure 5:
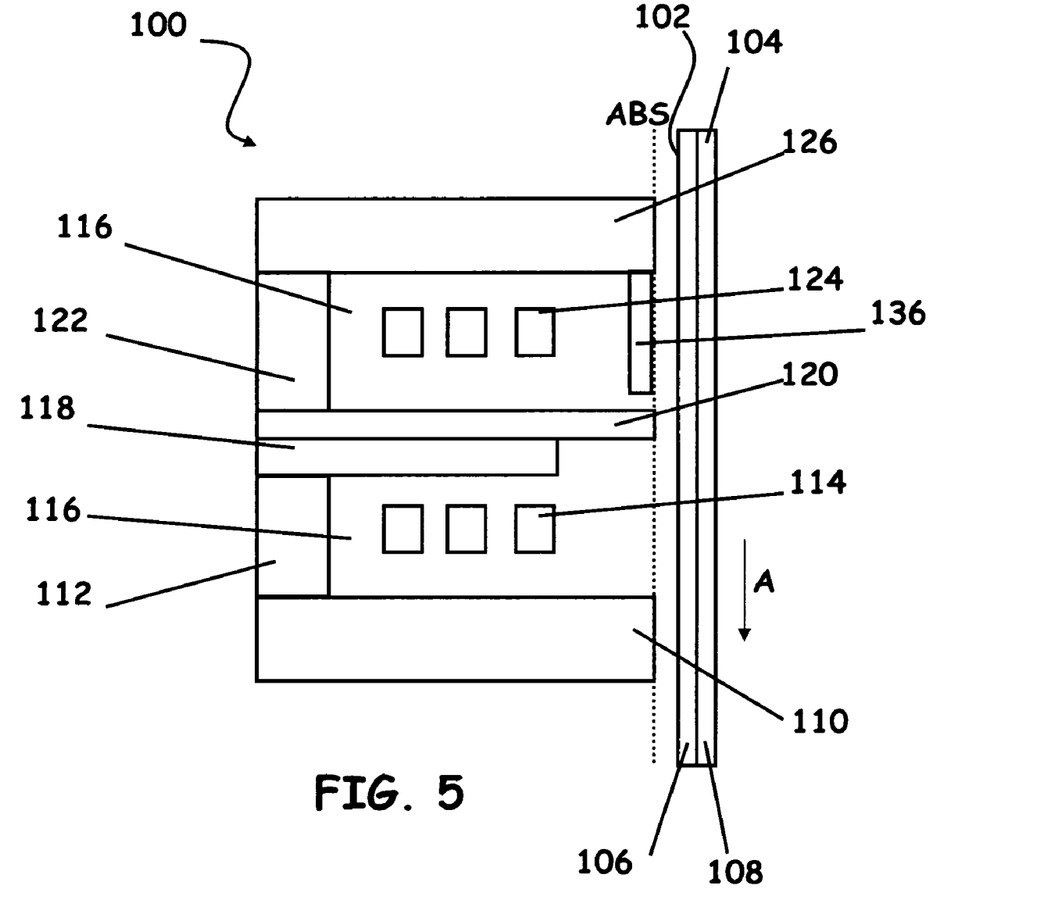
FIG. 5 is a cross-sectional view of an alternative structure for a perpendicular writer of the present invention taken along a plane normal to the air bearing surface in the intrack direction.
Figure 6:
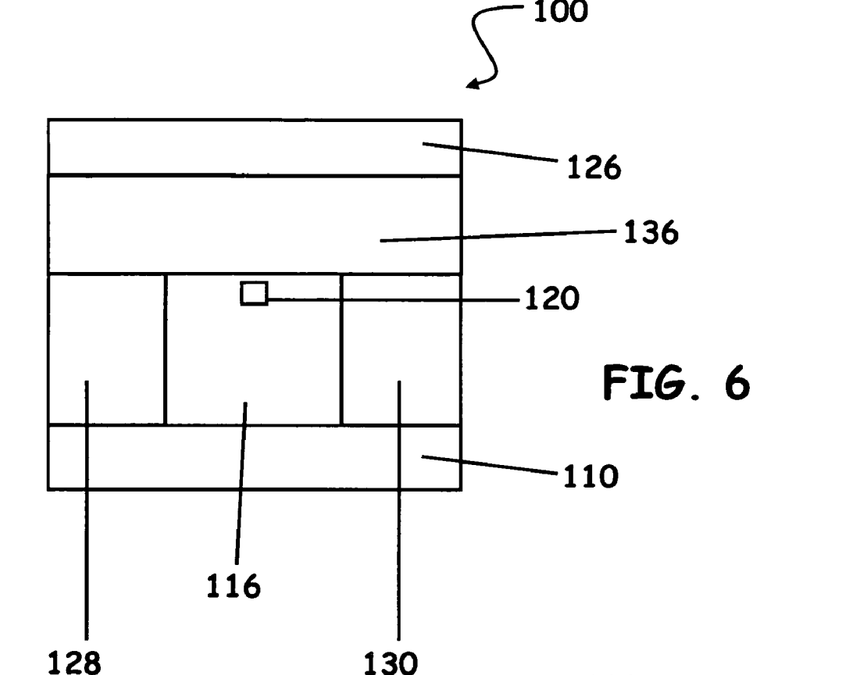
FIG. 6 is a bottom view of an alternative structure for a perpendicular writer of the present invention viewed at the ABS.

FIGS. 5 and 6 illustrate an alternative structure for perpendicular writer 100 which additionally includes top shorting shield 136. Top shorting shield 136 is located above main pole 120 at or near the air bearing surface. Top shorting shield 136 is formed of a block of soft magnetic material, such as NiFe. The inclusion of top shorting shield 136 improves the write field gradient in the downtrack direction. Magnetic flux returns to perpendicular writer 100 at the position of the top shorting shield 136 thereby improving the write field gradient above or in the downtrack direction from main pole 120. The perpendicular field component is reduced over the area of the top shorting shield 136 resulting in less destabilization of the information in recorded bits in the recording layer 106. As shown in FIGS. 5 and 6, top shorting shield 136 may be combined with first and second side shorting shields 128 and 130 to provide both downtrack modification of the write field gradient and crosstrack modification of the write field gradient.

Figure 7:
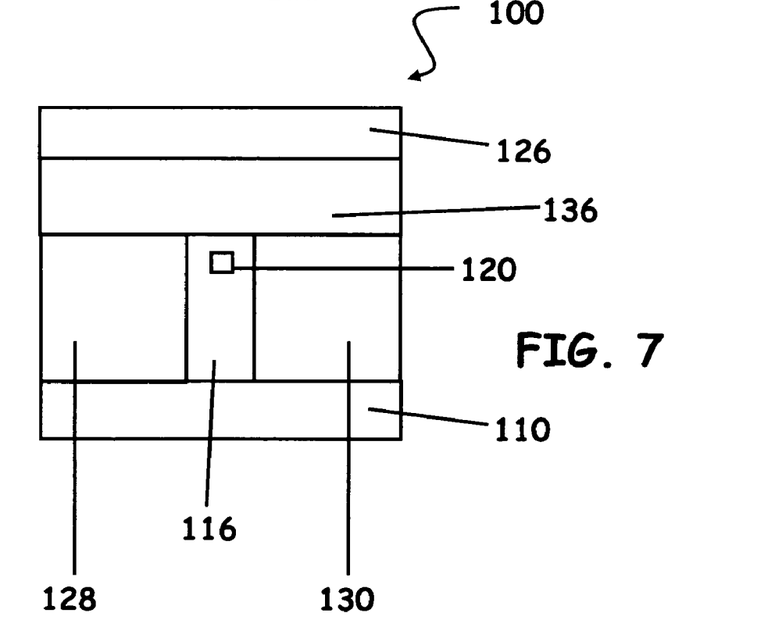
FIG. 7 is a bottom view of an alternative structure for a perpendicular writer of the present invention viewed at the ABS.

FIG. 7 illustrates a perpendicular writer 100 similar to that shown in FIG. 6 with modification of the distance between top shorting shield 136 and main pole 120, as well as, modification of the distance between first and second side shorting shields 128 and 130 and main pole 120. As described above for the perpendicular writer of FIGS. 2 and 3, the distance between the main pole 120 and each of first and second side shorting shields 128 and 130 may be modified to customize the write field gradient.

Figure 8:
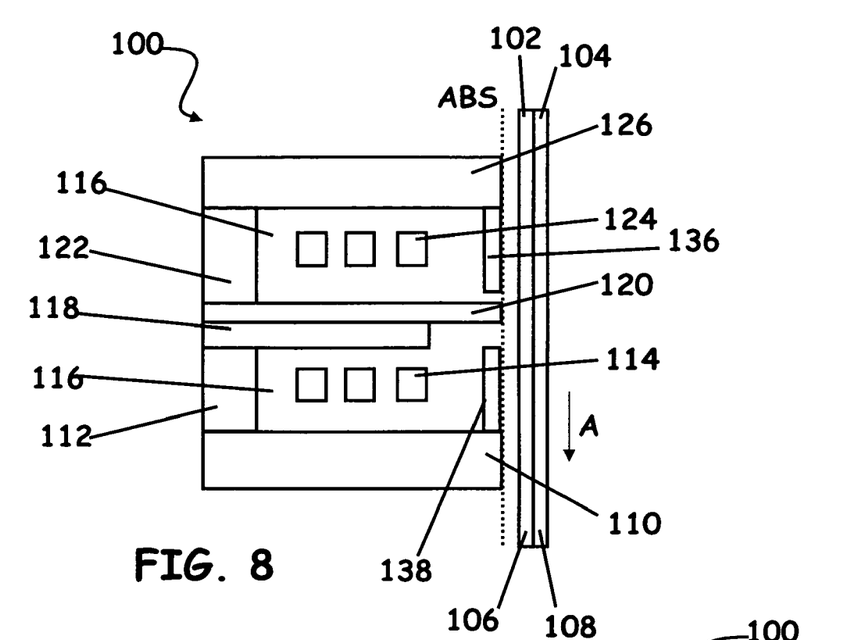
FIG. 8 is a cross-sectional view of an alternative structure for a perpendicular writer of the present invention taken along a plane normal to the air bearing surface in the intrack direction.
Figure 9:
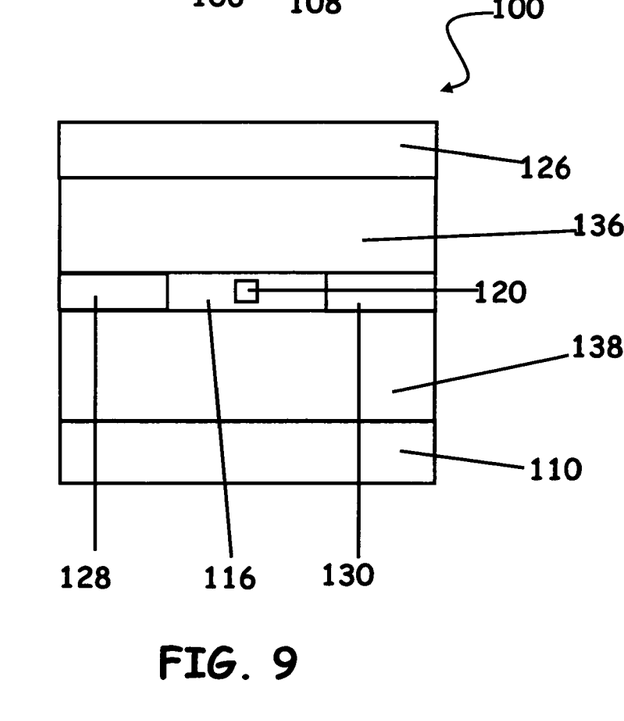
FIG. 9 is a bottom view of an alternative structure for a perpendicular writer of the present invention viewed at the ABS.

FIGS. 8 and 9 illustrate an alternative structure for perpendicular writer 100 that additionally includes both a top shorting shield 136 and bottom shorting shield 138. In FIGS. 8 and 9, perpendicular writer 100 includes top shorting shield 136 adjacent to main pole 120 in the downtrack direction and a bottom shorting shield 138 adjacent to main pole 120 opposite from top shorting shield 136 in the uptrack direction. First and second side shorting shields 128 and 130 connect top shorting shield 136 to bottom shorting shield 138 on either side of main pole 120. Bottom shorting shield 138 is formed from a block of soft magnetic material, such as NiFe. The perpendicular writer 100 of FIGS. 8 and 9 improves the write field gradient in both the downtrack and crosstrack directions as well as providing further reduction in the erase field in the uptrack direction.

Figure 10:
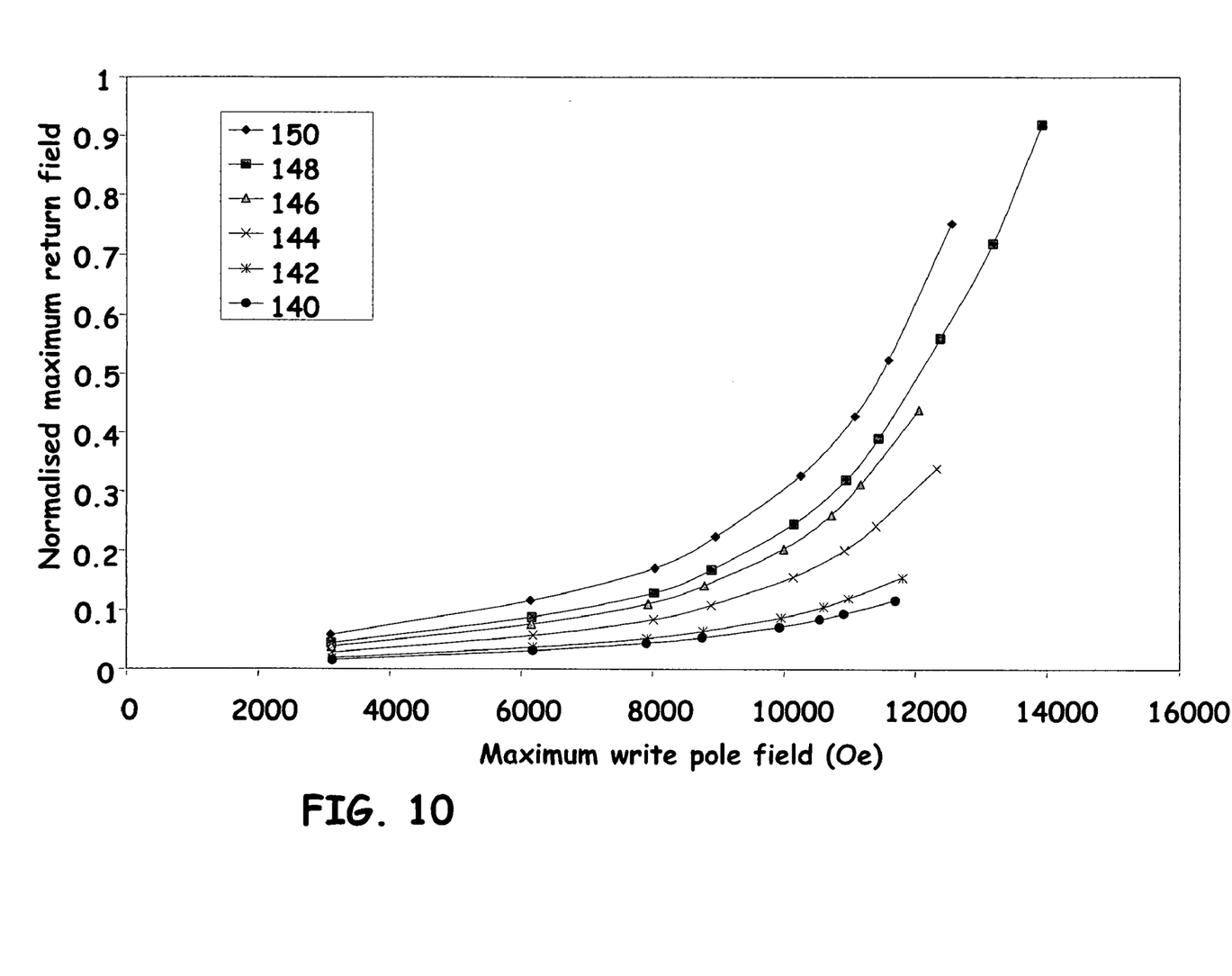
FIG. 10 is a graph of modeled maximum write pole field versus normalized maximum return field to compare alternative structures of perpendicular writers of the present invention to a control structure.

FIG. 10 is a plot of writer maximum main pole field versus normalized maximum return pole field. FIG. 10 illustrates modeling data using the finite element technique to show the advantage of perpendicular writer 100 of the present invention. The models for the various alternative structures for perpendicular writer 100 illustrated in FIGS. 2–9 are shown in the graph of FIG. 10. Line 140 corresponds to the structure of FIGS. 8 and 9. Line 142 corresponds to the structure of FIG. 7. Line 144 corresponds to the structure FIG. 3, while line 146 corresponds to the structure of FIG. 6. Line 148 corresponds to the structure FIG. 2, and line 150 is a control perpendicular writer without shorting shields. The graph of FIG. 10 illustrates that of the various designs for perpendicular writer 100 achieve the desired high write field with reduced return field as compared to a control perpendicular writer without shorting shields.

Perpendicular writer 100 may additionally be modified by recessing from the ABS, either singly or in combination: the first return pole 110, the side second shorting shield 128, side shorting shield 130, top shorting shield 136, bottom shorting shield 138 and second return pole 126. By recessing one or more components of perpendicular writer 100 away from the ABS, the reluctance through the media increases, thereby reducing the destabilization of recorded information in magnetic media 104.

Perpendicular writer 100 of the present invention includes side shorting shields 128 and 130 positioned to either side and spaced from main pole 120 at or near the ABS. The side shorting shields 128 and 130, with or without top and bottom shorting shields 136 and 138, form a box around main pole 120 at or near the ABS, thereby improving the write field gradient to reduce erasure fields. In the perpendicular writer 100 of the present invention, residual magnetic flux closes the reluctance circuit within the writer rather than passing through the magnetic media where recorded bits can be destabilized resulting in the information stored in the recording layer being erased. The size of the box may be adjusted by increasing or decreasing the distance from each shorting shield to the main pole 120. Alterations to the box directly affect the write field gradient.

The invention claimed is:

1. A transducing head having a writer portion comprising:
    a main pole having a first end and a second end;
    a coil positioned with respect to the main pole;
    a return pole forming first and second return paths for magnetic flux extending from the second end of the main pole; and
    a top shorting shield spaced from the main pole at approximately the first end of the main pole.

2. The transducing head of claim 1 wherein the writer portion additionally comprises a first side shorting shield that connects the first and second return paths and is spaced from the main pole at approximately the first end of the main pole.

3. The transducing head of claim 2 wherein the writer portion additionally comprises a second side shorting shield that connects the first and second return paths and is positioned on an opposite side of the main pole from the first side shorting shield and spaced from the main pole at approximately the first end of the main pole.

4. The transducing head of claim 3 wherein the first and second side shorting shields are formed of soft magnetic material for allowing magnetic flux to flow through the first and second side shorting shields into the first and second return paths.

5. The transducing head of claim 3 wherein the first side shorting shield and second side shorting shield are each spaced from the main pole at a distance to reduce erasure fields in a crosstrack direction.

6. The transducing head of claim 1 wherein the top shorting shield has a height extending away from an air bearing surface that is less than the height of the first and second return paths.

7. The transducing head of claim 1 additionally comprising a bottom shorting shield that has a height extending away from an air bearing surface that is less than the height of the first and second return paths.

8. The transducing head of claim 1 wherein the main pole is formed of high moment soft magnetic material.

9. The transducing head of claim 8 wherein the main pole additionally comprises a yoke of soft magnetic material.

10. The transducing head of claim 3 wherein:
    the return pole comprises a first return pole and a second return pole connected at a back via opposite the air bearing surface;
    the main pole is located between the first return pole and the second return pole, the main pole having its first end adjacent to the air bearing surface and its second end connected to the back via; and
    wherein the first and second side shorting shields are in contact with the first and second return poles at approximately the air bearing surface.

11. The transducing head of claim 10 additionally comprising electrically conductive coils positioned with respect to the main pole for generation of magnetic flux.

12. The transducing head of claim 10 wherein the first and second side shorting shields are formed of soft magnetic material for conducting magnetic flux from the main pole into the first and second return poles by way of the first and second side shorting shields.

13. The transducing head of claim 10 additionally comprising a bottom shorting shield.

14. The transducing head of claim 10 wherein the top shorting shield contacts the first and second side shorting shields and the first return pole.

15. The transducing head of claim 14 additionally comprising a bottom shorting shield spaced from the main pole wherein the bottom shorting shield contacts the first and second side shorting shields and the second return pole.

16. A magnetic recording head, the magnetic recording head comprising:
- a main pole having a first end;
- a coil positioned with respect to the main pole for generation of magnetic flux;
- a return pole forming first and second return paths for magnetic flux; and
- a side shorting shield that connects the first and second return paths, is formed of soft magnetic material, and is spaced from the main pole at approximately the first end of the main pole.

17. The magnetic recording head of claim 16 additionally comprising a top shorting shield formed of soft magnetic material spaced from the main pole at approximately the first end of the main pole.

18. The magnetic recording head of claim 16 additionally comprising a second side shorting shield that connects the first and second return paths and is positioned on an opposite side of the main pole from the first side shorting shield and spaced from the main pole at approximately the first end of the main pole.

19. The magnetic recording head of claim 18 additionally comprising a top shorting shield spaced from the main pole at approximately the first end of the main pole.

20. The magnetic recording head of claim 18 additionally comprising a bottom shorting shield spaced from the main pole at approximately the first end of the main pole.

21. A magnetic recording head, the magnetic recording head comprising:
- a main pole having a first end;
- a coil positioned with respect to the main pole for generation of magnetic flux;
- a return pole forming first and second return paths for magnetic flux; and
- a top shorting shield that is formed of soft magnetic material and is spaced from main pole at approximately the first end of the main pole.

22. The magnetic recording head of claim 21 wherein the top shorting shield has a height extending away from an air bearing surface that is less than the height of the first and second return paths.

23. The magnetic recording head of claim 21 additionally comprising a bottom shorting shield spaced from the main pole at approximately the first end of the main pole.

24. The magnetic recording head of claim 22 wherein the bottom shorting shield has a height extending away from an air bearing surface that is less than the height of the first and second return paths.

* * * * *

UNITED STATES PATENT AND TRADEMARK OFFICE
CERTIFICATE OF CORRECTION

PATENT NO. : 7,233,457 B2  Page 1 of 1
APPLICATION NO. : 10/737491
DATED : June 19, 2007
INVENTOR(S) : Alan B. Johnston et al.

It is certified that error appears in the above-identified patent and that said Letters Patent is hereby corrected as shown below:

TITLE PAGE, ITEM (73) Assignee delete "Bloomington, MN (US)", insert --Scotts Valley, CA (US)--

Signed and Sealed this

Nineteenth Day of February, 2008

JON W. DUDAS
*Director of the United States Patent and Trademark Office*